(12) United States Patent
Stehley

(10) Patent No.: US 8,505,015 B2
(45) Date of Patent: Aug. 6, 2013

(54) PLACING A GROUP WORK ITEM INTO EVERY PRIORITIZED WORK QUEUE OF MULTIPLE PARALLEL PROCESSING UNITS BASED ON PREFERRED PLACEMENT OF THE WORK QUEUES

(75) Inventor: Curtis Stehley, Baltimore, MD (US)

(73) Assignee: Teradata US, Inc., Dayton, OH (US)

( * ) Notice: Subject to any disclaimer, the term of this patent is extended or adjusted under 35 U.S.C. 154(b) by 771 days.

(21) Appl. No.: 12/608,268

(22) Filed: Oct. 29, 2009

(65) Prior Publication Data

US 2010/0107170 A1  Apr. 29, 2010

Related U.S. Application Data

(60) Provisional application No. 61/109,256, filed on Oct. 29, 2008.

(51) Int. Cl.
*G06F 9/46* (2006.01)
*G06F 9/40* (2006.01)
*G06F 7/38* (2006.01)
*G06F 13/00* (2006.01)

(52) U.S. Cl.
USPC ........... 718/103; 718/105; 718/102; 718/100; 712/214; 712/220; 711/133

(58) Field of Classification Search
None
See application file for complete search history.

(56) References Cited

U.S. PATENT DOCUMENTS

| | | | | |
|---|---|---|---|---|
| 5,261,053 A * | 11/1993 | Valencia | ........................ | 711/133 |
| 6,128,642 A * | 10/2000 | Doraswamy et al. | ......... | 718/105 |
| 6,748,593 B1 * | 6/2004 | Brenner et al. | ............... | 718/105 |
| 7,448,036 B2 * | 11/2008 | Brenner et al. | ............... | 718/103 |
| 7,516,456 B2 * | 4/2009 | Aguilar et al. | ................ | 718/102 |

* cited by examiner

*Primary Examiner* — Meng An
*Assistant Examiner* — Bing Zhao
(74) *Attorney, Agent, or Firm* — John D. Cowart

(57) ABSTRACT

A "group work sorting" technique is used in a parallel computing system that executes multiple items of work across multiple parallel processing units, where each parallel processing unit processes one or more of the work items according to their positions in a prioritized work queue that corresponds to the parallel processing unit. When implementing the technique, one or more of the parallel processing units receives a new work item to be placed into a first work queue that corresponds to the parallel processing unit and receives data that indicates where one or more other parallel processing units would prefer to place the new work item in the prioritized work queues that correspond to the other parallel processing units. The parallel processing unit uses the received data as a guide in placing the new work item into the first work queue.

45 Claims, 3 Drawing Sheets

PLACING A GROUP WORK ITEM INTO EVERY PRIORITIZED WORK QUEUE OF MULTIPLE PARALLEL PROCESSING UNITS BASED ON PREFERRED PLACEMENT OF THE WORK QUEUES

CROSS-REFERENCE TO RELATED APPLICATION

This application claims priority from and incorporates by reference U.S. Provisional Application 61/109,256, filed on Oct. 29, 2008.

BACKGROUND

Parallel computing systems, such as a database system implemented in a parallel-processing environment, are typically used to speed up the processing of incoming requests by breaking the requests into multiple tasks and executing the tasks in parallel across multiple processing units. When such a system receives multiple requests that each requires a certain amount of work be performed by multiple processing units, the system typically schedules the work across the processing units in an attempt to ensure that all of the work is completed.

The simplest way to schedule work in a parallel computing system is on a first-come, first-served basis. However, for many applications a more flexible scheduling policy is desirable. For example, in a relational database system that has a backlog of long-running, low-priority queries, it is typically desirable, upon receiving a short-running, high-priority query, to execute the high-priority query immediately rather than forcing it to wait behind the low-priority queries. Also, in a relational database system that has multiple users, it is often desirable to implement a scheduling policy that allows the system administrator to limit the resource consumption of any single user to prevent that user from monopolizing the system.

In general, the scheduling algorithms that are typically used to address these situations have two important characteristics:
1. They sort (that is, re-order) the work to be performed by the parallel processing units; and
2. They sort work based on both (a) global, static quantities (e.g., the priority of a work item or the user associated with a work item) and (b) local, dynamic quantities (e.g., the amount of CPU and disk I/O currently being consumed by a particular processing unit on behalf of a particular user).

Problems typically arise in parallel computing systems when a work item needs to execute on multiple processing units. Such a work item is typically referred to as "group work" because its execution requires participation by a group of processing units. In general, group work has the following characteristics:
1. It is processed by a group of processing units;
2. It typically must be processed by every processing unit in the group;
3. Once it begins executing on a particular processing unit, it consumes resources on that processing unit until it finishes; and
4. It typically cannot finish until it executes on every processing unit in the group.

The scheduling algorithms that are used in sorting group work across multiple processing units are prone to deadlock, usually for one of two reasons:

1. Processing units become available at different times. The following example illustrates: A low-priority group work item, L, arrives. It must run on processing units X and Y. X happens to be idle and consequently begins executing L immediately. Y is busy executing a previous work item and consequently queues L. Subsequently a high-priority group work item, H, arrives. It also must run on processing units X and Y. X is already running L and consequently queues H. Y is still running the previous work item and still has L queued. Since H is high-priority and L is low-priority, Y sorts H in front of L, and, once the previous work item completes, it begins running H. At this point X and Y are deadlocked: X is running L (which cannot finish until it runs on Y), and Y is running H (which cannot finish until it runs on X).
2. Sorting based on local quantities. The following example illustrates: A group work item, W1, associated with a user, U1, arrives. It must run on processing units X and Y. Both processing units are busy executing previous work items, and consequently both queue W1. Subsequently a group work item, W2, associated with a different user, U2, arrives. It also must run on processing units X and Y. The particular scheduling policy in effect on the system dictates that work items associated with users who are consuming more than a certain CPU percentage threshold should be treated as low priority. At the moment, on processing unit X, U1 is under this threshold and U2 is over the threshold. Consequently W2 is queued behind W1. However, on processing unit Y the situation is reversed: U1 is over the threshold and U2 is under the threshold. Consequently W2 is queued in front of W1. When the previous work items complete, X begins running W1, and Y begins running W2. At this point X and Y are deadlocked: X is running W1 (which cannot finish until it runs on Y), and Y is running W2 (which cannot finish until it runs on X).

SUMMARY

Described below is a technique for use in a parallel computing system in executing multiple items of work across multiple parallel processing units, where each parallel processing unit processes one or more of the work items according to their positions in a prioritized work queue that corresponds to the parallel processing unit. When implementing the technique, one or more of the parallel processing units receives a new work item to be placed into a first work queue that corresponds to the parallel processing unit and receives data that indicates where one or more other parallel processing units would prefer to place the new work item in the prioritized work queues that correspond to the other parallel processing units. The parallel processing unit uses the received data as a guide in placing the new work item into the first work queue.

In some implementations, the received data includes a number indicating how many work items will be placed behind the new work item in the prioritized work queues that correspond to the other parallel processing units. In placing the new work item into the first work queue, the parallel processing unit places the new work item ahead of the number of work items indicated by the received data. In other implementations, the received data indicates, from among all of the prioritized work queues corresponding to parallel processing units that are to receive the new work item, the lowest number of work items that will be placed behind the new item in any of the prioritized work queues.

In certain implementations, the parallel processing unit also creates data that indicates where in the first work queue the parallel processing unit would prefer to place the new work item, and it makes the data available for use in assessing where to place the new work item in each of the prioritized work queues that correspond to one or more of the other parallel processing units. The data created often indicates a number of work items that the parallel processing unit would prefer to place behind the new work item in the first work queue. The received data often includes information indicating that the parallel processing unit should place the new work item somewhere other than where it would prefer to place the new work item in the first work queue.

In other implementations, the created data includes a first number indicating how many work items the parallel processing unit would prefer to place behind the new work item in the first work queue, and the received data includes a second number indicating how many work items the parallel processing unit should place behind the new work item in the first work queue. The first number is typically greater than the second number.

Other features and advantages will become apparent from the description and claims that follow.

DETAILED DESCRIPTION

Figure 1:
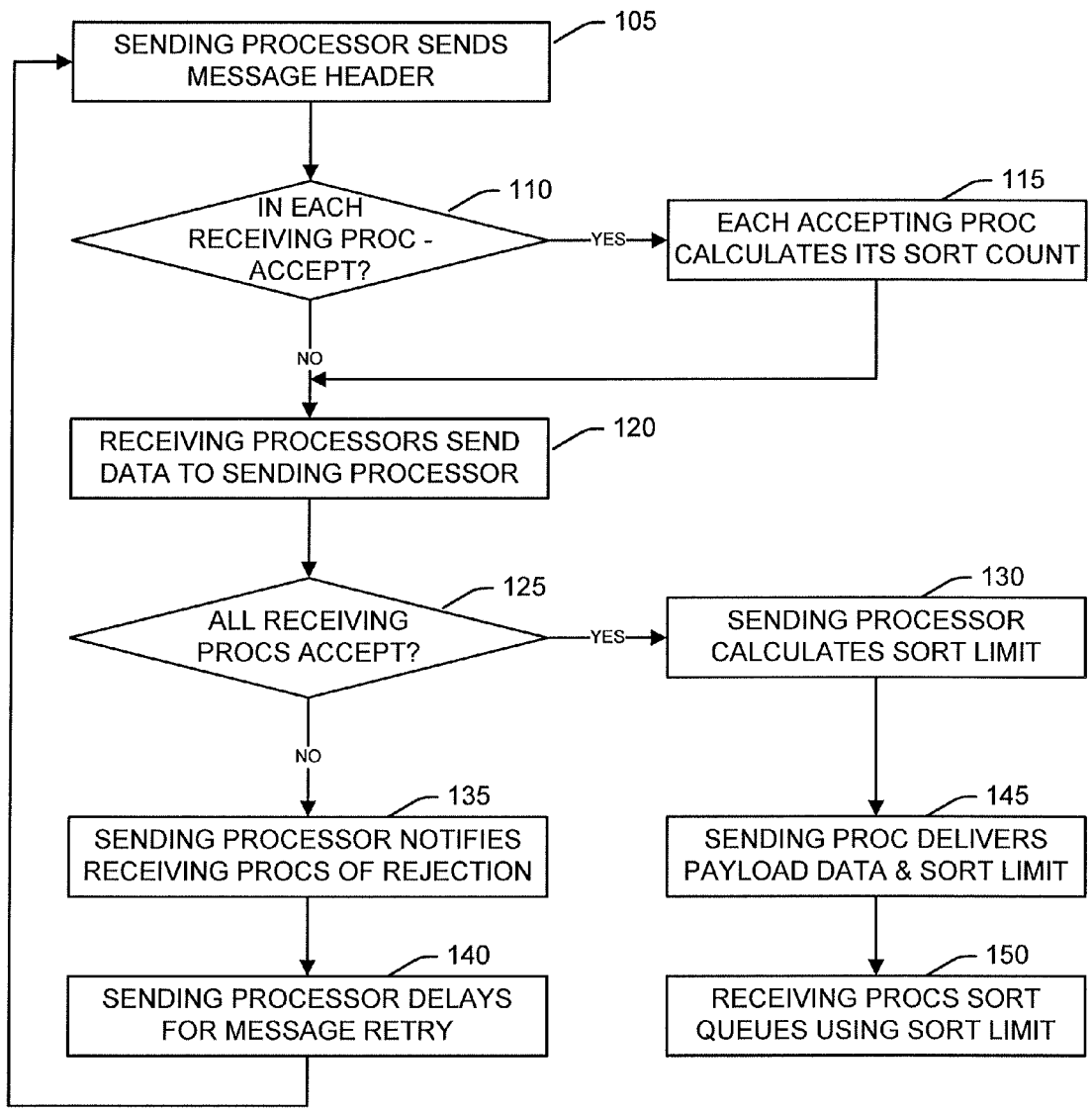
FIG. 1 is flow diagram of a group messaging sequence that supports group work sorting.

Described below is a group work sorting technique for use in a parallel computing system that allows parallel processing units to sort incoming group work items while avoiding deadlocks among the parallel processing units. This technique, called "Global Work Sorting" (or "GWS"), is based on the principles that some amount of sorting is safe but that too much sorting can lead to deadlock, and that a system-wide "global" approach to sorting within the parallel processing units provides optimal results. GWS allows sorting (thus allowing scheduling policies to be enforced) but limits the amount of sorting that can be done by the individual parallel processing units (in order to avoid deadlock). In particular, the technique allows the system to limit the sorting that occurs in one or more of the parallel processing units based upon the amount of sorting that can be done in the other parallel processing units.

As an example, ten low-priority group work items, L0-L9, are introduced into a parallel computing system. All ten must run on parallel processing units X and Y. Processing unit X is idle, and consequently it begins executing L0 and places L1-L9 in a prioritized work queue that it maintains. (The work items in the queue are "prioritized" according to their positions in the queue—the item at the front of the queue is executed first, and the items behind it are executed sequentially thereafter.) Processing unit Y is busy executing a previous work item, and thus it places all ten items, L0-L9, in its prioritized queue. Subsequently a high-priority work item, H, arrives. It also must run on processing units X and Y. If X and Y are allowed to sort H to the front of their respective work queues, deadlock will occur—X will forever run L0, and Y will forever run H. If on the other hand no sorting is allowed, H will be placed at the end of each queue and deadlock will not occur, but the high-priority item H will not run until all ten low-priority work items are complete. The GWS technique allows sorting in this situation but limits the amount of sorting that can take place—e.g., by allowing Y to sort the high-priority item H in front of L1 but behind L0, while X sorts H to the front of its queue. Consequently, L0 has the opportunity to run on both X and Y before either X or Y tries to execute H. Deadlock is avoided, and the high-priority work item is allowed to run before nine of the ten low-priority work items.

As described in more detail below, one way to implement the GWS technique is by adding a small amount of logic to the system's group-message delivery subsystem. A wide variety of different mechanisms are available for reliably delivering a message to a group of parallel processing units in a parallel computer system, but in general a group-messaging sequence goes as follows:

1. The sending processor sends a message (or message header) to the receiving processors;
2. Each receiving processor decides whether to accept or reject the message;
3. A small amount of data is sent from each receiving processor back to the sending processor to indicate whether the receiving processor wishes to accept or reject the message;
4. The sending processor (or in some cases the network itself) looks at the data returned by each receiving processor—if all receiving processors want to accept the message, it is accepted; if any receiving processor wants to reject the message, it is rejected; and
5. The sending processor sends a second message to the receiving processors to indicate whether the message has been accepted or rejected; if the message has been accepted, the second message also includes the payload data.

FIG. 1 shows one example of a modified group-messaging sequence that allows implementation of global work sorting:

1. The sending processor sends the message header to the receiving processors to indicate that a new group work item has been received (step 105);
2. Each receiving processor decides whether to accept or reject the message, and thus the new work item (step 110); if a receiving processor decides to accept the message, it performs a trial sort to determine how many work items (known as the "sort count") in its prioritized work queue it would like to place behind the new work item (step 115);
3. Each receiving processor sends a small amount of data back to the sending processor to indicate whether the receiving processor wishes to accept or reject the message (step 120)—in the event that the receiving processor wishes to accept the message, this data includes the sort count;
4. The sending processor (or in some cases the network itself) reviews the data returned by the receiving processors to assess whether they want to accept the message (step 125)—if all receiving processors want to accept the message, it is accepted; if any receiving processor wants to reject the message, it is rejected; if the message is accepted, the sending processor (or the network itself) performs a "low sort" operation on the sort counts returned by the receiving processors—i.e., it assesses which of the sort counts has the lowest value, and the result becomes the "sort limit" (step 130);
5. The sending processor sends a second message to the receiving processors to indicate whether the message has been accepted or rejected; if the message has been rejected, the second message notifies the receiving processors of the rejection (step 135), and the sending processor delays for some period of time (step 140) before retrying the message; if the message has been accepted, this second message notifies the receiving processors of the acceptance and forwards the payload data related to the new work item, including the sort limit (step 145);

6. Upon receiving the payload data and the sort limit, each receiving processor sorts the new work item into its prioritized work queue, placing it ahead of no more items than are allowed by the sort limit (step 150)—e.g., for a sort limit of N, the receiving processor sorts the new work item ahead of no more than N other work items in its queue.

Figure 2:
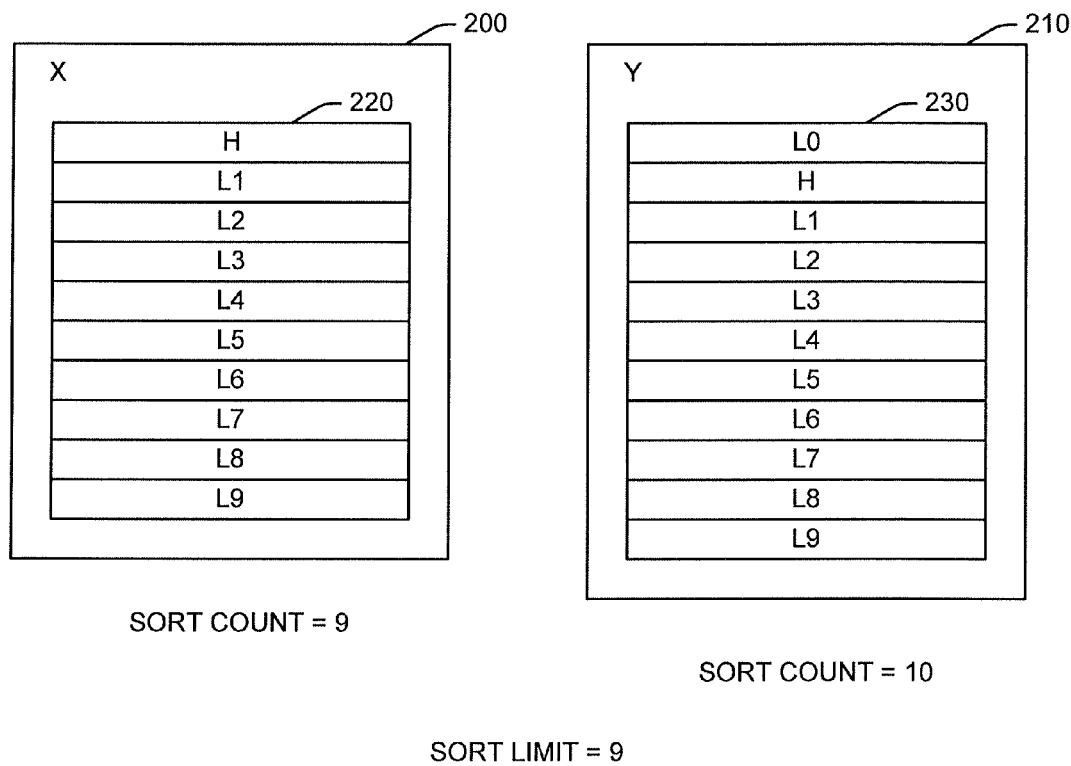
FIG. 2 is a diagram showing the implementation of group work sorting according to one specific example.

FIG. 2 shows the result that would occur in applying this GWS technique to the example above. Processing unit X (item 200) would return a "sort count" of nine (since it wants to sort H in front of L1-L9), and processing unit Y (item 210) would return a sort count of ten (since it wants to sort H in front of L0-L9). A "low sort" operation on these sort counts yields a "sort limit" of nine. Since processing unit X only has nine work items in its prioritized work queue 220, a sort limit of nine allows X to perform an unconstrained sort, and consequently X places H at the front of its queue 220, ahead of all nine items there. Since processing unit Y has ten work items (L0-L9) in its prioritized work queue 230, and because the sort limit is nine, Y can place H in front of all but one of the work items (that is, in front of L1-L9 but behind L0). The technique therefore ensures that X and Y each executes L0 before executing H to avoid deadlock but that both processing units give H higher priority than L1-L9.

Figure 3:
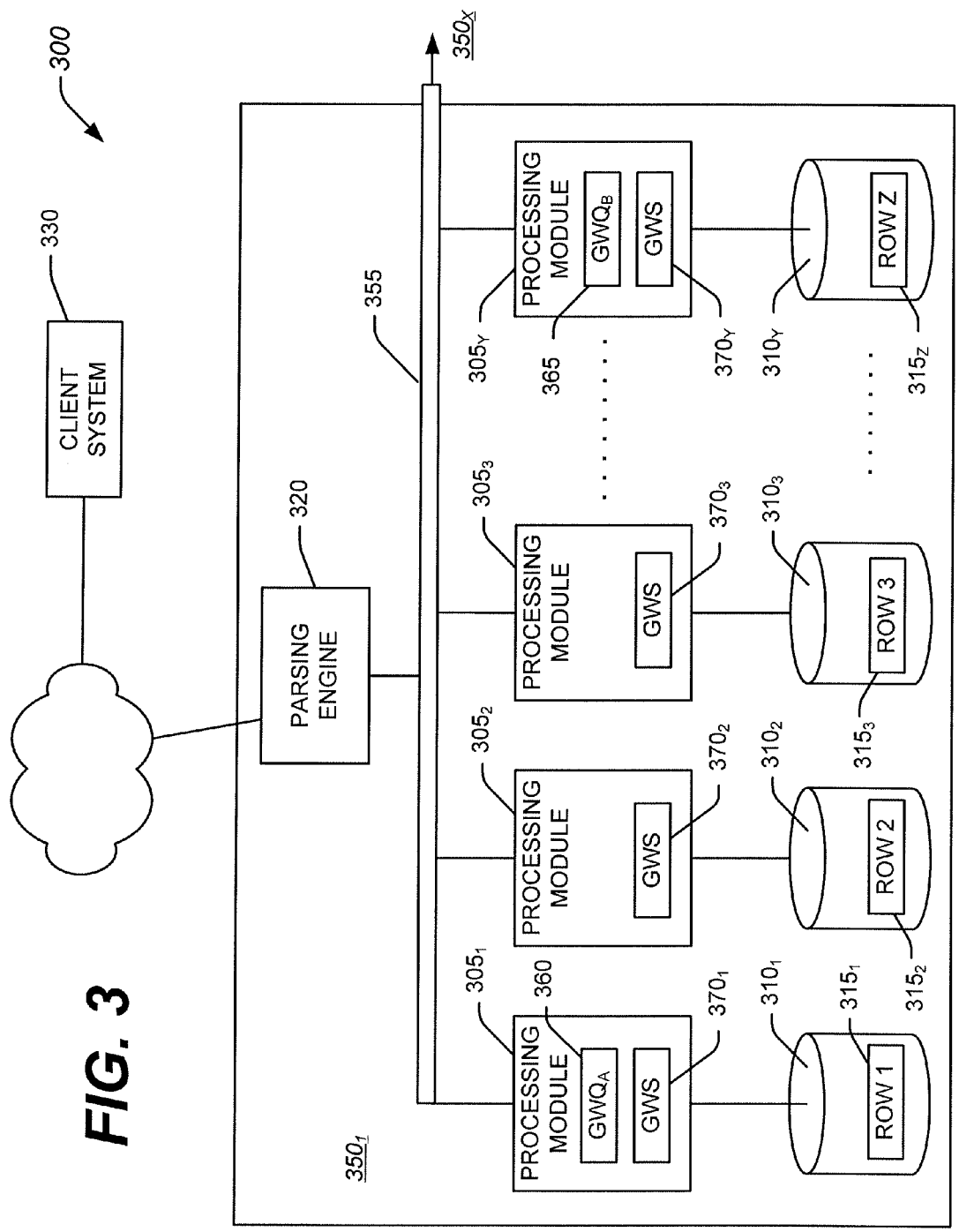
FIG. 3 is a diagram showing a parallel database system that implements group work sorting.

FIG. 3 shows an example architecture for a database system 300 in which group work sorting is implemented. In this example, the database system 300 includes a relational database management system (RDBMS) built upon a massively parallel processing (MPP), shared-nothing platform, with a single processing node $350_1$ of the MPP system shown. In theory, there is no limit to the number of processing nodes $350_{1 \ldots X}$ an MPP system like this one can have. One such MPP system is the Teradata Active Data Warehouse™ system sold by Teradata Corporation of Miamisburg, Ohio. Other types of database systems, however, such as object-relational database management systems (ORDBMS), parallel shared-everything systems and those built on symmetric multi-processing (SMP) platforms, also benefit from group work sorting.

In many systems, each of the processing nodes $350_{1 \ldots X}$ includes a single computer-processor motherboard, which typically includes a single dual-processor or quad-processor chipset. The precise hardware configuration of any given system, however, is not important for purposes of implementing group work sorting, and the hardware typically will vary from system vendor to system vendor, as well as from system to system sold by a single vendor.

In an MPP, shared-nothing environment, each of the processing nodes $350_{1 \ldots X}$ of the database system 300 includes one or more processing modules $305_{1 \ldots Y}$ that manage the storage and retrieval of data in data-storage facilities $310_{1 \ldots Y}$. Each of the processing modules $305_{1 \ldots Y}$ manages a portion of a database that is stored in a corresponding one of the data-storage facilities $310_{1 \ldots Y}$. Each of the data-storage facilities $310_{1 \ldots Y}$ is typically implemented as a data-storage subsystem that includes one or more disk controllers managing a multitude of disk drives. In a shared-nothing environment, each of the processing modules $305_{1 \ldots Y}$ has access only to the corresponding one of the data-storage facilities $310_{1 \ldots Y}$ that it manages.

The database system 300 stores data in one or more relational tables within the data-storage facilities $310_{1 \ldots Y}$. In the system shown here, the rows $315_{1 \ldots Z}$ of the tables are distributed across the multiple processing modules $305_{1 \ldots Y}$ and stored in the corresponding multiple data-storage facilities $310_{1 \ldots Y}$ accordingly. The database system 300 also distributes processing tasks across the processing modules $305_{1 \ldots Y}$ to allow faster, more efficient completion of those tasks than would otherwise be possible. One or more parsing engines 320 implemented in one or more of the processing nodes $350_{1 \ldots X}$ coordinate the distribution of processing tasks among the processing modules $305_{1 \ldots Y}$, including (a) the distribution of table rows $315_{1 \ldots Z}$ across the processing modules $305_{1 \ldots Y}$ for storage in the data-storage facilities $310_{1 \ldots Y}$ and (b) the insertion and retrieval of table rows as needed in response to queries received from database users, such as a user at a client computer system 330. The data warehouse usually receives queries in a standard format, such as the Structured Query Language (SQL) put forth by the American National Standards Institute (ANSI).

The database system 300 also includes a messaging layer 355 (known as "BYNET" in a Teradata system) across which the processing modules $305_{1 \ldots Y}$ of the multiple processing nodes $350_{1 \ldots X}$ communicate. As described above, the process of group work sorting is carried out, in part, through a series of messages exchanged among the processing modules $305_{1 \ldots Y}$ over the messaging layer 355. In the context of the database system shown here, the "group work items" to which group work sorting applies are those database tasks that require participation by a group of the processing modules $305_{1 \ldots Y}$ (called "group-AMP tasks" in a Teradata system) or by all of the modules ("all-AMP tasks").

A database system 300 like that shown here often will simultaneously process multiple work groups of multiple types. When this is the case, each of the processing nodes $350_{1 \ldots X}$ in the database system 300 maintains a group work queue for each of the group worktypes. In the example shown here, the database system 300 processes group work items for two worktypes—type A and type B. Each of the processing nodes $350_{1 \ldots X}$ maintains one group work queue 360 for worktype A and another group work queue 365 for worktype B. In most systems, each of the group work queues is maintained by a single one of the processing modules $305_{1 \ldots Y}$ within each of the processing nodes $350_{1 \ldots X}$.

As described above, the processing modules $305_{1 \ldots Y}$ include global work sorting (GWS) logic modules $370_{1 \ldots Y}$, or executable program code that enables the database system 300 to carry out the GWS technique. In most systems, the GWS logic modules $370_{1 \ldots Y}$ include the program code necessary to allow each of the processing modules $305_{1 \ldots Y}$ to act as both sender and receiver of group messages.

Simultaneous Receipt of Group Work Items

One potential problem with global work sorting arises when two group work items are received nearly simultaneously. When this occurs, the sort limit that is calculated for the global work sorting process could be in error. As an example, parallel units X and Y both have ten low-priority work items, L0-L9, queued. A high-priority work item, H, arrives and needs to run on both parallel units X and Y. The message header is sent to X and Y, and each returns a sort count of ten, and so the sort limit is set to ten. In the meantime, before X and Y have sorted H into their queues, another low-priority message, L10, arrives, also needing to run on both parallel units X and Y. L10 is processed very quickly by the message delivery system and is queued behind L9 by both X and Y. Soon thereafter, X and Y finally sort H into their queues based upon the sort limit of ten that was previously established. Consequently, both X and Y queue H in front of L1-L10 but behind L0. They should have queued H in front of L0 as well, but because the sort limit was established before L10 was received and the sort occurred after L10 was received, the sort limit is effectively off by one.

There are two solutions to this simultaneous-message problem:

1. Serialize delivery of group work items. The system delivers group work items to the parallel processing units in a serial manner, ensuring that each item is placed properly in the queue for each processing unit before delivering the next work item. The ease with which this technique can be implemented, however, depends on how the system's group message delivery subsystem is implemented. In some systems serialized delivery is easy and relatively inexpensive (in terms of system resource usage) to implement, and in other systems it is costly to implement.
2. Reject-and-retry flagging. The system sets a flag upon receiving a group work item and clears the flag when the work item has been sorted into the queues. The system rejects work items that are received while the flag is set. Rejected messages can be retried later on with high probability of success.

In most systems, a combination of these two techniques is the best approach: Serializing group messages to the greatest extent economically possible in the group message delivery subsystem, and using a reject-and-retry flag to handle non-serialized messages. The approach that is best for any particular system will depend upon the architecture of that system.

Computer-based and Other Implementations

The various implementations of the invention are realized in electronic hardware, computer software, or combinations of these technologies. Most implementations include one or more computer programs executed by a programmable computer. In general, the computer includes one or more processors, one or more data-storage components (e.g., volatile and nonvolatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

The text above describes one or more specific embodiments of a broader invention. The invention also is carried out in a variety of alternative embodiments and thus is not limited to those described here. Many other embodiments are also within the scope of the following claims.

I claim:

1. A method for use in a parallel computing system in executing multiple items of work across at least two parallel processing units, where at least some of the work items must be processed by each of the at least two parallel processing units, and where each of the at least two parallel processing units processes the work items according to their positions in a prioritized work queue that corresponds to that parallel processing unit, the method comprising, in at least a first one of the at least two parallel processing units:

receiving a new work item that must be placed into the prioritized work queue for each of the at least two parallel processing units;

receiving data that indicates where in its prioritized work queue at least one other of the at least two parallel processing units would prefer to place the new work item, where the received data includes a number indicating how many other work items would be placed behind the new work item in the prioritized work queue that corresponds to the at least one other of the at least two parallel processing units;

using the received data in assessing where to place the new work item into the prioritized work queue for the first one of the at least two parallel processing units; and placing the new work item in the prioritized work queue for the first one of the at least two parallel processing units.

2. The method of claim 1, where, in placing the new work item into its prioritized work queue, the first one of the at least two parallel processing units places the new work item ahead of the number of work items indicated by the received data.

3. The method of claim 1, where the received data indicates the lowest number of work items that will be placed behind the new work item in any of the prioritized work queues that correspond to any other of the at least two parallel processing units.

4. The method of claim 1, further comprising:

creating data that indicates where in its prioritized work queue the first one of the at least two parallel processing units would prefer to place the new work item; and making the created data available for use in assessing where to place the new work item in the prioritized work queues for each of the other of the at least two parallel processing units.

5. The method of claim 4, where the created data indicates a number of work items that the first one of the at least two parallel processing units would prefer to place behind the new work item in its prioritized work queue.

6. The method of claim 4, where the received data includes information indicating that the first one of the at least two parallel processing units should place the new work item somewhere other than where it would prefer to place the new work item in its prioritized work queue.

7. The method of claim 6, where:

the created data includes a first number indicating how many work items the first one of the at least two parallel processing units would prefer to place behind the new work item in its prioritized work queue; and the received data includes a second number indicating how many work items the first one of the at least two parallel processing units should place behind the new work item in its prioritized work queue.

8. The method of claim 7, where the first number is greater than the second number.

9. A parallel computing system comprising:

at least two parallel processing units that execute multiple items of work, where at least some of the work items must be processed by each of the at least two parallel processing units; and at least two prioritized work queues, each corresponding to one of the at least two parallel processing units, and each maintaining a prioritized list of work items to be executed by the corresponding one of the at least two parallel processing units;

where at least a first one of the at least two parallel processing units is configured to:

receive a new work item that must be placed into the prioritized work queue for each of the at least two parallel processing units;

receive data that indicates where in its prioritized work queue at least one other of the at least two parallel processing units would prefer to place the new work item, where the received data includes a number indicating how many other work items would be placed behind the new work item in the prioritized work queue that corresponds to the at least one other of the at least two parallel processing units;

use the received data in assessing where to place the new work item into the prioritized work queue for the first one of the at least two parallel processing units; and place the new work item in the prioritized work queue for the first one of the at least two parallel processing units.

10. The system of claim 9, where, in placing the new work item into its prioritized work queue, the first one of the at least two parallel processing units places the new work item ahead of a number of work items indicated by the received data.

11. The system of claim 9, where the received data indicates the lowest number of work items that will be placed behind the new work item in any of the prioritized work queues that correspond to any other of the at least two parallel processing units.

12. The system of claim 9, where the first one of the at least two parallel processing units is also configured to:

create data that indicates where in its prioritized work queue the first one of the at least two parallel processing units would prefer to place the new work item; and make the created data available for use in assessing where to place the new work item in the prioritized work queues for each of the other of the at least two parallel processing units.

13. The system of claim 12, where the created data indicates a number of work items that the first parallel processing unit would prefer to place behind the new work item in its prioritized work queue.

14. The system of claim 12, where the received data includes information indicating that the first one of the at least two parallel processing units should place the new work item somewhere other than where it would prefer to place the new work item in its prioritized work queue.

15. The system of claim 14, where:

the created data includes a first number indicating how many work items the first one of the at least two parallel processing units would prefer to place behind the new work item in its prioritized work queue; and the received data includes a second number indicating how many work items the first one of the at least two parallel processing units should place behind the new work item in its prioritized work queue.

16. The system of claim 15, where the first number is greater than the second number.

17. An article of manufacture comprising computer-readable program instructions stored on a non-transitory computer-readable storage medium for use in a parallel computing system in executing multiple items of work across at least two parallel processing units, where at least some of the work items must be processed by each of the at least two parallel processing units, and where each of the at least two parallel processing units processes the work items according to their positions in a prioritized work queue that corresponds to that parallel processing unit, and where the program instructions, when executed by at least a first one of the parallel processing units, cause the first one of the at least two parallel processing units to:

receive a new work item that must be placed into the prioritized work queue for each of the at least two parallel processing units;

receive data that indicates where in its prioritized work queue at least one other of the at least two parallel processing units would prefer to place the new work item, where the received data includes a number indicating how many other work items would be placed behind the new work item in the prioritized work queue that corresponds to the at least one other of the at least two parallel processing units;

use the received data in assessing where to place the new work item into the prioritized work queue for the first one of the at least two parallel processing units; and place the new work item in the prioritized work queue for the first one of the at least two parallel processing units.

18. The article of claim 17, where, in placing the new work item into its prioritized work queue, the first one of the at least two parallel processing units places the new work item ahead of the number of work items indicated by the received data.

19. The article of claim 17, where the received data indicates the lowest number of work items that will be placed behind the new work item in any of the prioritized work queues that correspond to any other of the at least two parallel processing units.

20. The article of claim 17, where the first one of the at least two parallel processing units is also caused to:

create data that indicates where in its prioritized work queue the first one of the at least two parallel processing units would prefer to place the new work item; and make the created data available for use in assessing where to place the new work item in the prioritized work queues for each of the other of the at least two parallel processing units.

21. The article of claim 20, where the created data indicates a number of work items that the first one of the at least two parallel processing units would prefer to place behind the new work item in its prioritized work queue.

22. The article of claim 20, where the received data includes information indicating that the first one of the at least two parallel processing units should place the new work item somewhere other than where it would prefer to place the new work item in its prioritized work queue.

23. The article of claim 22, where:

the created data includes a first number indicating how many work items the first one of the at least two parallel processing units would prefer to place behind the new work item in its prioritized work queue; and the received data includes a second number indicating how many work items the first one of the at least two parallel processing units should place behind the new work item in its prioritized work queue.

24. The article of claim 23, where the first number is greater than the second number.

25. A method for use in a parallel computing system in executing multiple items of work across at least two parallel processing units, where at least some of the work items must be processed by each of the at least two parallel processing units, and where each of the at least two parallel processing units processes the work items according to their positions in a prioritized work queue that corresponds to that parallel processing unit, the method comprising, in at least a first one of the at least two parallel processing units:

receiving a new work item that must be placed into the prioritized work queue for each of the at least two parallel processing units;

creating data that indicates where in its prioritized work queue the first one of the at least two parallel processing units would prefer to place the new work item;

making the created data available for use in assessing where to place the new work item in the prioritized work queues for each of the other of the at least two parallel processing units;

receiving data that indicates where in its prioritized work queue at least one other of the at least two parallel processing units would prefer to place the new work item;

using the received data in assessing where to place the new work item into the prioritized work queue for the first one of the at least two parallel processing units; and placing the new work item in the prioritized work queue for the first one of the at least two parallel processing units.

26. The method of claim 25, where, in placing the new work item into its prioritized work queue, the first one of the at least two parallel processing units places the new work item ahead of the number of work items indicated by the received data.

27. The method of claim 25, where the received data indicates the lowest number of work items that will be placed behind the new work item in any of the prioritized work queues that correspond to any other of the at least two parallel processing units.

28. The method of claim 25, where the created data indicates a number of work items that the first one of the at least two parallel processing units would prefer to place behind the new work item in its prioritized work queue.

29. The method of claim 25, where the received data includes information indicating that the first one of the at least two parallel processing units should place the new work item somewhere other than where it would prefer to place the new work item in its prioritized work queue.

30. The method of claim 29, where:
the created data includes a first number indicating how many work items the first one of the at least two parallel processing units would prefer to place behind the new work item in its prioritized work queue; and
the received data includes a second number indicating how many work items the first one of the at least two parallel processing units should place behind the new work item in its prioritized work queue.

31. The method of claim 30, where the first number is greater than the second number.

32. A parallel computing system comprising:
at least two parallel processing units that execute multiple items of work, where at least some of the work items must be processed by each of the at least two parallel processing units; and
at least two prioritized work queues, each corresponding to one of the at least two parallel processing units, and each maintaining a prioritized list of work items to be executed by the corresponding one of the at least two parallel processing units;
where at least a first one of the at least two parallel processing units is configured to:
receive a new work item that must be placed into the prioritized work queue for each of the at least two parallel processing units;
create data that indicates where in its prioritized work queue the first one of the at least two parallel processing units would prefer to place the new work item;
make the created data available for use in assessing where to place the new work item in the prioritized work queues for each of the other of the at least two parallel processing units;
receive data that indicates where in its prioritized work queue at least one other of the at least two parallel processing units would prefer to place the new work item;
use the received data in assessing where to place the new work item into the prioritized work queue for the first one of the at least two parallel processing units; and
place the new work item in the prioritized work queue for the first one of the at least two parallel processing units.

33. The system of claim 32, where, in placing the new work item into its prioritized work queue, the first one of the at least two parallel processing units places the new work item ahead of a number of work items indicated by the received data.

34. The system of claim 32, where the received data indicates the lowest number of work items that will be placed behind the new work item in any of the prioritized work queues that correspond to any other of the at least two parallel processing units.

35. The system of claim 32, where the created data indicates a number of work items that the first parallel processing unit would prefer to place behind the new work item in its prioritized work queue.

36. The system of claim 32, where the received data includes information indicating that the first one of the at least two parallel processing units should place the new work item somewhere other than where it would prefer to place the new work item in its prioritized work queue.

37. The system of claim 36, where:
the created data includes a first number indicating how many work items the first one of the at least two parallel processing units would prefer to place behind the new work item in its prioritized work queue; and
the received data includes a second number indicating how many work items the first one of the at least two parallel processing units should place behind the new work item in its prioritized work queue.

38. The system of claim 37, where the first number is greater than the second number.

39. An article of manufacture comprising computer-readable program instructions stored on a non-transitory computer-readable storage medium for use in a parallel computing system in executing multiple items of work across at least two parallel processing units, where at least some of the work items must be processed by each of the at least two parallel processing units, and where each of the at least two parallel processing units processes the work items according to their positions in a prioritized work queue that corresponds to that parallel processing unit, and where the program instructions, when executed by at least a first one of the parallel processing units, cause the first one of the at least two parallel processing units to:
receive a new work item that must be placed into the prioritized work queue for each of the at least two parallel processing units;
create data that indicates where in its prioritized work queue the first one of the at least two parallel processing units would prefer to place the new work item;
make the created data available for use in assessing where to place the new work item in the prioritized work queues for each of the other of the at least two parallel processing units;

receive data that indicates where in its prioritized work queue at least one other of the at least two parallel processing units would prefer to place the new work item;

use the received data in assessing where to place the new work item into the prioritized work queue for the first one of the at least two parallel processing units; and place the new work item in the prioritized work queue for the first one of the at least two parallel processing units.

40. The article of claim 39, where, in placing the new work item into its prioritized work queue, the first one of the at least two parallel processing units places the new work item ahead of the number of work items indicated by the received data.

41. The article of claim 39, where the received data indicates the lowest number of work items that will be placed behind the new work item in any of the prioritized work queues that correspond to any other of the at least two parallel processing units.

42. The article of claim 39, where the created data indicates a number of work items that the first one of the at least two parallel processing units would prefer to place behind the new work item in its prioritized work queue.

43. The article of claim 39, where the received data includes information indicating that the first one of the at least two parallel processing units should place the new work item somewhere other than where it would prefer to place the new work item in its prioritized work queue.

44. The article of claim 43, where:

the created data includes a first number indicating how many work items the first one of the at least two parallel processing units would prefer to place behind the new work item in its prioritized work queue; and the received data includes a second number indicating how many work items the first one of the at least two parallel processing units should place behind the new work item in its prioritized work queue.

45. The article of claim 44, where the first number is greater than the second number.

\* \* \* \* \*